United States Patent [19]

Poncet

[11] Patent Number: 4,907,721
[45] Date of Patent: Mar. 13, 1990

[54] APPARATUS FOR REMOVING RESIDUAL STORED MATERIAL

[76] Inventor: Jean-Claude Poncet, Champagne-sur-Loue, 39600 Arbois, France

[21] Appl. No.: 94,896

[22] Filed: Sep. 10, 1987

[51] Int. Cl.⁴ ............................................. B67D 5/08
[52] U.S. Cl. ..................................... 222/58; 222/195;
 222/198; 222/199; 52/195; 52/197; 198/533
[58] Field of Search .......... 222/58, 195, 196, 198–200;
 52/192, 195, 197, 220; 98/54, 55, 56; 99/646 S;
 414/304, 326, 323; 198/533, 572, 609; 193/2 B;
 406/134, 136, 138, 75

[56] References Cited

U.S. PATENT DOCUMENTS

| | | | |
|---|---|---|---|
| 2,381,802 | 8/1945 | Booth et al. | 222/200 |
| 2,560,480 | 7/1951 | Rogers et al. | 222/200 |
| 2,907,036 | 9/1959 | Collins et al. | 98/56 |
| 2,953,282 | 9/1960 | Peterson | 222/196 |
| 3,941,258 | 3/1976 | Ide | 414/304 |
| 4,125,970 | 11/1978 | Vidal | 52/197 X |
| 4,177,942 | 12/1979 | Hakkinen et al. | 222/198 |
| 4,194,611 | 3/1980 | Mukhin | 193/26 |
| 4,396,104 | 8/1983 | Beck | 193/26 |
| 4,408,889 | 10/1983 | Peschl | 414/304 X |
| 4,471,891 | 9/1884 | Musschoot | 222/199 |
| 4,563,844 | 1/1986 | Driedger | 52/197 X |
| 4,603,795 | 8/1986 | Bonerb et al. | 414/326 X |

FOREIGN PATENT DOCUMENTS

| | | |
|---|---|---|
| 0890772 | 10/1953 | Fed. Rep. of Germany . |
| 2052978 | 5/1971 | Fed. Rep. of Germany . |
| 2513106 | 7/1976 | Fed. Rep. of Germany ........ 222/58 |
| 3039362 | 5/1982 | Fed. Rep. of Germany . |
| 919557 | 2/1963 | United Kingdom ................ 414/323 |
| 0964758 | 7/1964 | United Kingdom . |

Primary Examiner—Joseph J. Rolla
Assistant Examiner—Gregory L. Huson
Attorney, Agent, or Firm—Sandler & Greenblum

[57] ABSTRACT

A bulk storage silo including a slanted floor opening into a discharge chute provided in the foundation of the silo wherein the floor is covered by a deck composed of a plurality of plates connected to vibrators arranged in a predetermined pattern which, when activated, causes the residual amount of grain which cannot be removed by gravity to flow into the discharge chute.

31 Claims, 7 Drawing Sheets

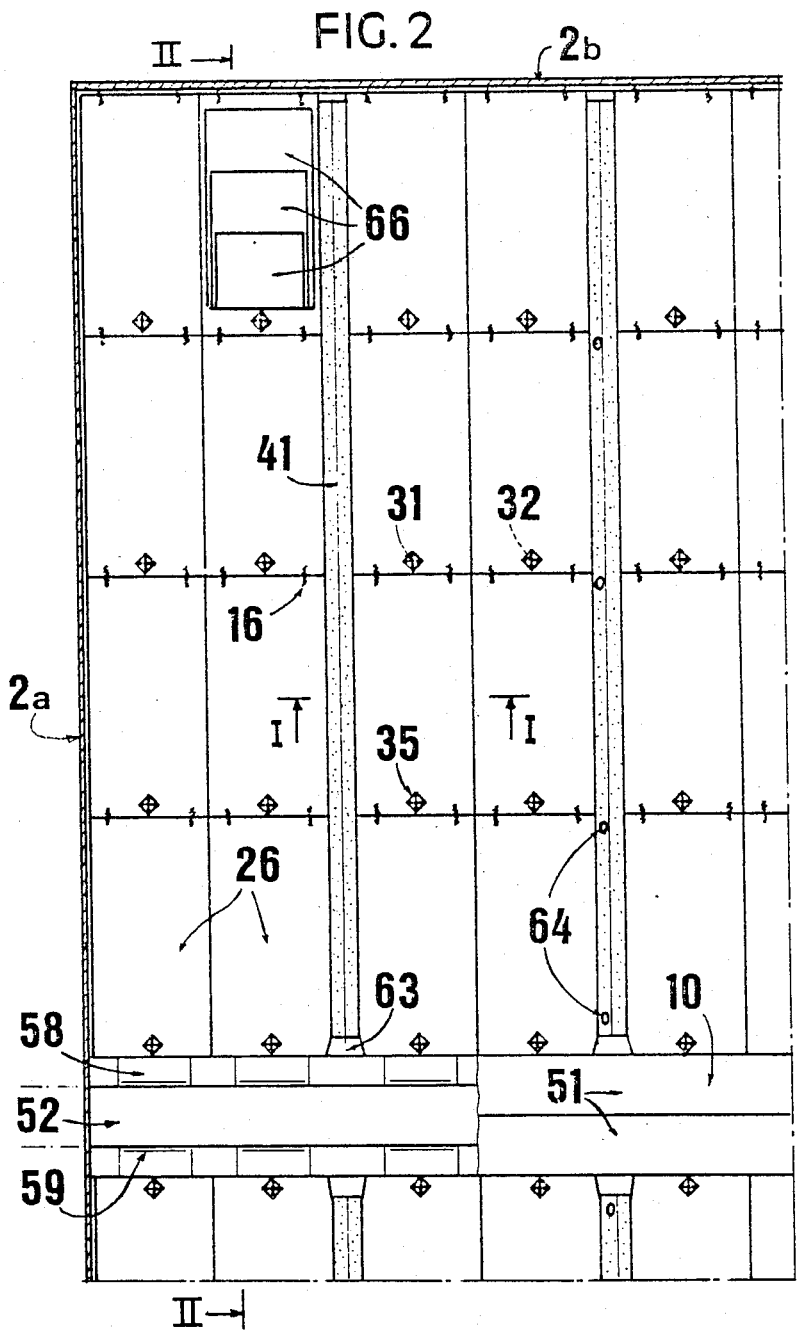

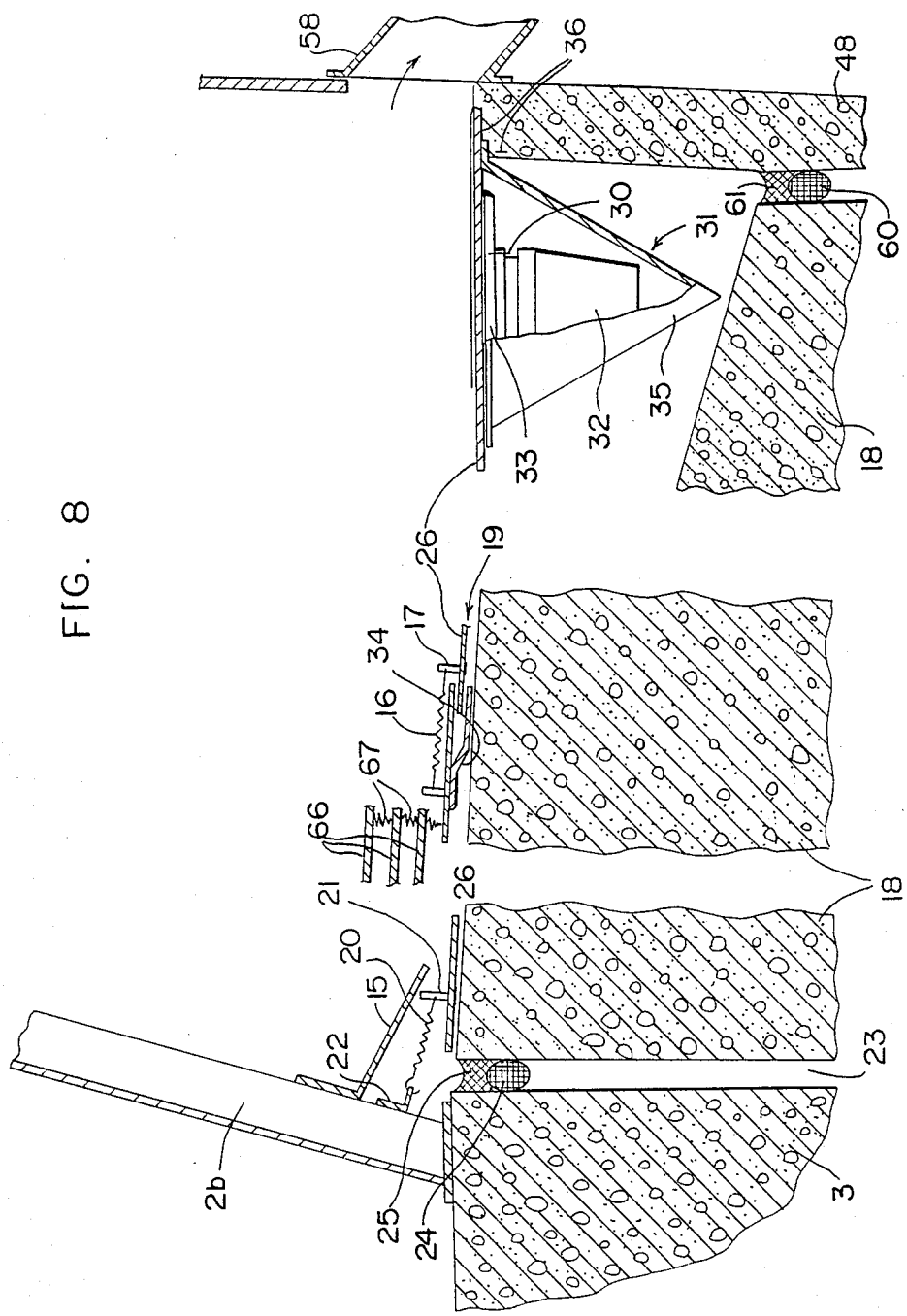

APPARATUS FOR REMOVING RESIDUAL STORED MATERIAL

BACKGROUND OF THE INVENTION

1. Field of the Invention

The present invention generally relates to storage facilities, and more particularly to storage facilities, such as silos, specifically adapted for substantially complete removal of stored granular or particulate material such as grains or cereals. Specifically, the present invention is directed to flat bottomed bulk silo having a floor which is adapted to vibrate to enhance the removal of stored grain.

2. Discussion of Background and Material Information

Grain storage structures can be classified as being either vertical or horizontal silos, depending upon their height to width ratio, and their reclamation features. For a given storage capacity, horizontal silos are usually less expensive to construct or manufacture.

Removal of grain from vertical silos for the most part is effected by gravity. In flat bottomed horizontal silos, however, a residual slope must still be mechanically agitated in order to remove the stored material. Several techniques have been previously developed for the purpose of mechanically removing stored material from such flat bottomed horizontal silos. Such prior art attempts, however, suffer from disadvantages as detailed hereinafter.

In one case, an auger or chain-type conveyor is used to sweep the surface of a residual slope of grain towards the center of a collection area or bin into an exhaust opening. This type of equipment, however, tends to cause kernels of the grain within the bin to break, and leaves approximately one inch of unswept material on the bottom of the silo which must be cleaned using a separate cleaning procedure. This equipment is also limited to use in essentially round or arcuately shaped bins.

In another type of equipment, air is blown outwardly from ventilation ducts which are positioned on the bottom of the silo to fluidize the residual slope of granular material and urge the material outwardly from the bin into a reclaiming or recovery conveyor. These types of systems, however, require relatively large sized fans with huge power intakes. Moreover, such systems stir up a considerable amount of particulate material, such as dust, during operation thereby increasing the possibility of explosion hazards within the silo. Also, the range of the air ducts is limited to about 40 feet, thereby limiting the size of the storage unit.

In still another type of conventional apparatus, recovery of material from the residual slope of stored material is achieved by a raised chain conveyor. Such conveyors, however, are cumbersome to operate because they often interfere with structural elements of the silo, such as interior tension rods and ventilation ducts. Also, this type of equipment requires at least a full-time operator, and leaves grain on the floor which requires cleaning.

Despite the economic advantage which horizontal silos have in comparison to vertical silos, the development of horizontal storage silos has thus far been hindered by the lack of a convenient reclamation or recovery system from the residual slope.

SUMMARY OF THE INVENTION

The present invention is directed to a bulk storage silo or storage facility having a foundation including a central concrete channel, means for housing a reclamation conveyor disposed in the channel which opens onto a lower edge of a slanted floor slab, a metal deck supported by the floor slab and a plurality of vibrators mounted on the deck.

The vibrators include means for vibrating the deck with a predetermined amplitude and frequency, and are preferably positioned on the deck in a predetermined pattern. The metal deck is preferably composed of a plurality of metal plates, which may be flat, corrugated, or ribbed, and preferably include stiffeners, wherein at least some of the plates include means for supporting the vibrators.

Preferably, each of the vibrators is bolted onto a base which is rigidly connected to a respective plate in such a manner that the vibrator and the base are mounted either above or below the plates. Alternatively, each of the vibrators may be bolted onto a stiff member which is rigidly connected to a respective plate in such a manner that the vibrator and the stiff member are mounted either above or below the plates.

The vibrators are preferably electromechanical, electrically or electromagnetically operated, and may also be hydraulically, or pneumatically actuated, the pneumatically actuated vibrators being actuated by shock, ball, roller or piston.

The vibrators are preferably located along the surface of a deck along lines which are parallel to the channel. Each of the vibrator lines is preferably adapted to be set into motion by a pressure switch which is connected to a central control unit.

The silo includes a plurality of ventilation ducts positioned transversely to the channel which are anchored on the floor slab between a plurality of metal plates and are connected to a ventilation gallery. The metal plates forming the top of said deck are preferably retained in position by a plurality of tension springs which are hooked to an exterior wall of the silo and to studs welded on the plates, preferably wherein two adjacent plates are attached along their edges in a parallel fashion to the channel by tension springs which are hooked to studs which are welded to an upper one of the plates and to a lower one of the plates, wherein a groove is formed by the upper plate and a grooved plate, the latter being fixably secured beneath a lower edge of the upper plate. A plurality of additional plates are preferably positioned over the first plates, wherein the additional plates are spaced by conical compression springs, and the first set of plates and the additional set of plates include a compressible, multi-level metal deck. Preferably, the first set of plates are supported by conical compression springs which are fixably secured to the surface of the slab.

The present invention is also directed to a bulk storage silo including a storage building or facility having a concrete foundation, including a central, substantially open top silo, which is located adjacent to a lower edge of an angled or slanted floor slab which includes means for supporting a metal deck and a plurality of vibrators for vibrating the deck at a predetermined amplitude and frequency.

Brief Description of the Drawings

The above and other objects, features and advantages of the present invention will be more particularly described hereinafter with respect to the accompanying drawings, in which like reference numerals represent similar parts throughout, and which drawings illustrate one embodiment of the invention presented by way of non-limiting example, and in which:

FIG. 2 is a partial plan view of the inside of a bin formed in accordance with the present invention;

FIG. 8 illustrates an embodiment wherein the vibrator is mounted below the deck in an embodiment otherwise similar to the embodiment shown in FIG. 4.

DETAILED DESCRIPTION OF THE DRAWINGS

Figure 1:
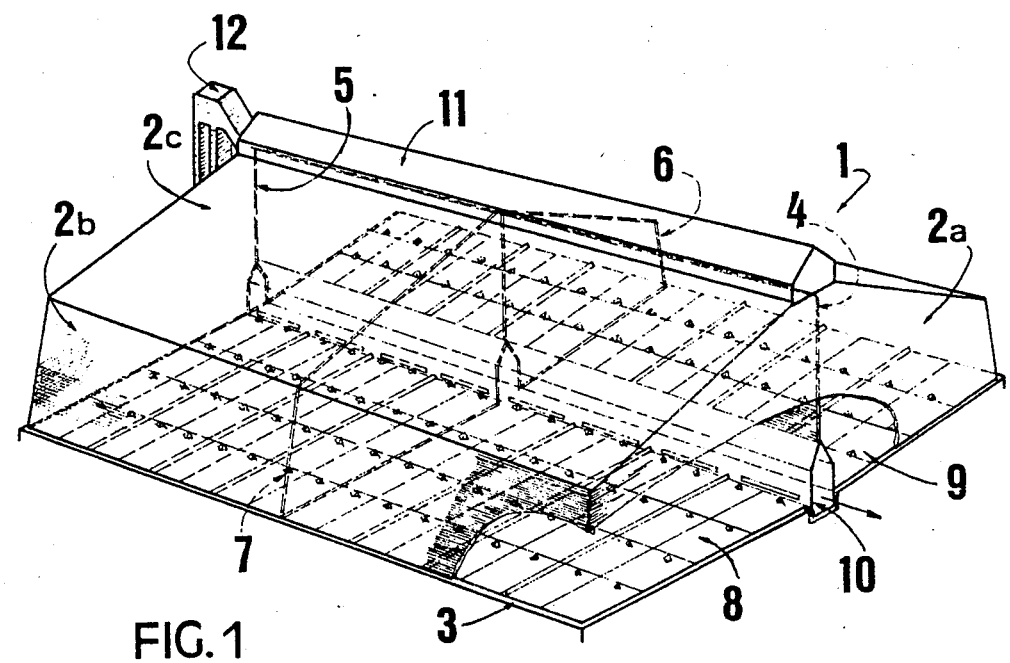
FIG. 1 is a perspective view of a silo formed in accordance with the present invention.

The present invention is intended to obviate the shortcomings of the previously described storage systems, and to provide a fully automatic and substantially complete removal of stored material from a residual slope of stored material in any type of storage container or facility having an essentially flat bottom without causing dust to arise or damaging kernels of stored grain, and yet requiring a relatively small intake of power. In addition, the apparatus of the present invention is particularly suitable to be adapted or modified to suit the particular material being stored, depending upon such features or product characteristics as a specific weight, density, size, shape, moisture content, internal friction, or grain shape.

To this end, in accordance with the present invention, a silo is provided with a bottom surface or floor which slants slightly towards a collection channel or trough. The floor supports a metal deck and includes vibrators which are carried by and are capable of imparting vibrations with a predetermined combination of frequency and amplitude to the metal deck. In this fashion, the progressive collapse of the residual slope of stored material will occur and the material being emptied from the storage will move towards the collection trough.

In one preferred embodiment, the metal deck include a plurality of steel plates. At least some of these steel plates will serve to support a vibrator mounted on a base plate or on stiff members which in turn are rigidly connected to the steel plate. The vibrators can be selected from the group consisting of electromechanical, eccentric, electromagnetic, hydraulic, and pneumatic vibrators, e.g., ball, roller or piston, or any other suitable means for vibrating.

In a preferred embodiment, to which the present invention should be in no way restricted, the silo includes a warehouse having a rectangular base and a symmetrical polygonal cross-section. The interior volume of the silo is divided equally between four storage bins by partition walls which are located along the longitudinal and transverse axes of the silo. The floor of the silo has two symmetrical slabs, one for each of two adjacent bins, with each slab slanting or being inclined slightly towards a longitudinal collection and discharge trough which is centered with respect to the building.

In another embodiment, the vibrators within the bins are located along essentially straight lines which run substantially parallel to the collection trough. This arrangement permits each line of vibrators to be interlocked with a pressure switch which is connected to a central control unit. Preferably, each vibrator is also protected by a metal cover which is shaped as a pyramid in order to provide minimum resistance to grain flow over the vibrator.

In another advantageous embodiment, the collection and discharge trough houses a metal casing having side openings which are opturated or opened by valves which conduct a flow of grain within the casing. The grain is thus discharge conveyor.

In still another embodiment, the silo is loaded from the top by a conveyor belt which feeds from a bucket conveyor and introduces granular material into a selected bin by a tripper.

In addition, and preferably, ventilation ducts having a triangular or semi-circular cross-sections are preferably positioned in a perpendicular fashion with respect to the the bottom slab of the silo. A fan then blows air into the the bottom slab of the silo. A fan then blows air into the central gallery, which communicates via valves with the ventilation ducts. Air admitted into the ductwork flows into the grain via holes or slots, i.e., perforations, within the ducts.

Referring now more specifically to the drawings, the silo will be hereinafter described with the same reference numerals referring to the same or similar elements.

The silo is a structure, building, or facility for storing grain or any other granular or particulate material and may be constructed from steel, concrete, or any other suitable building material. The structure of the silo includes two end walls 2a, two side walls 2b, and a roof preferably composed of two sloping sides 2c. In constructing the building the structure may be anchored onto foundation beams 3 by conventional anchoring elements. The volume or space inside the building is divided preferably into four substantially equal bins by four partition walls, i.e., by two longitudinal walls 4 and 5, and two or more cross or transverse walls 6 and 7. The bottom of the bins include two floor portions 8 and 9, each of which is common to two adjacent bins and the bottoms of which slant towards a central gallery or collection and discharge trough or tunnel 10 as described hereinafter. The rooftop 11 of building 1 is constructed, preferably as housing elevated above the slope of the roof, so as to accommodate a loading conveyor and tripper 13 which is fed by elevator 12.

Figure 3:
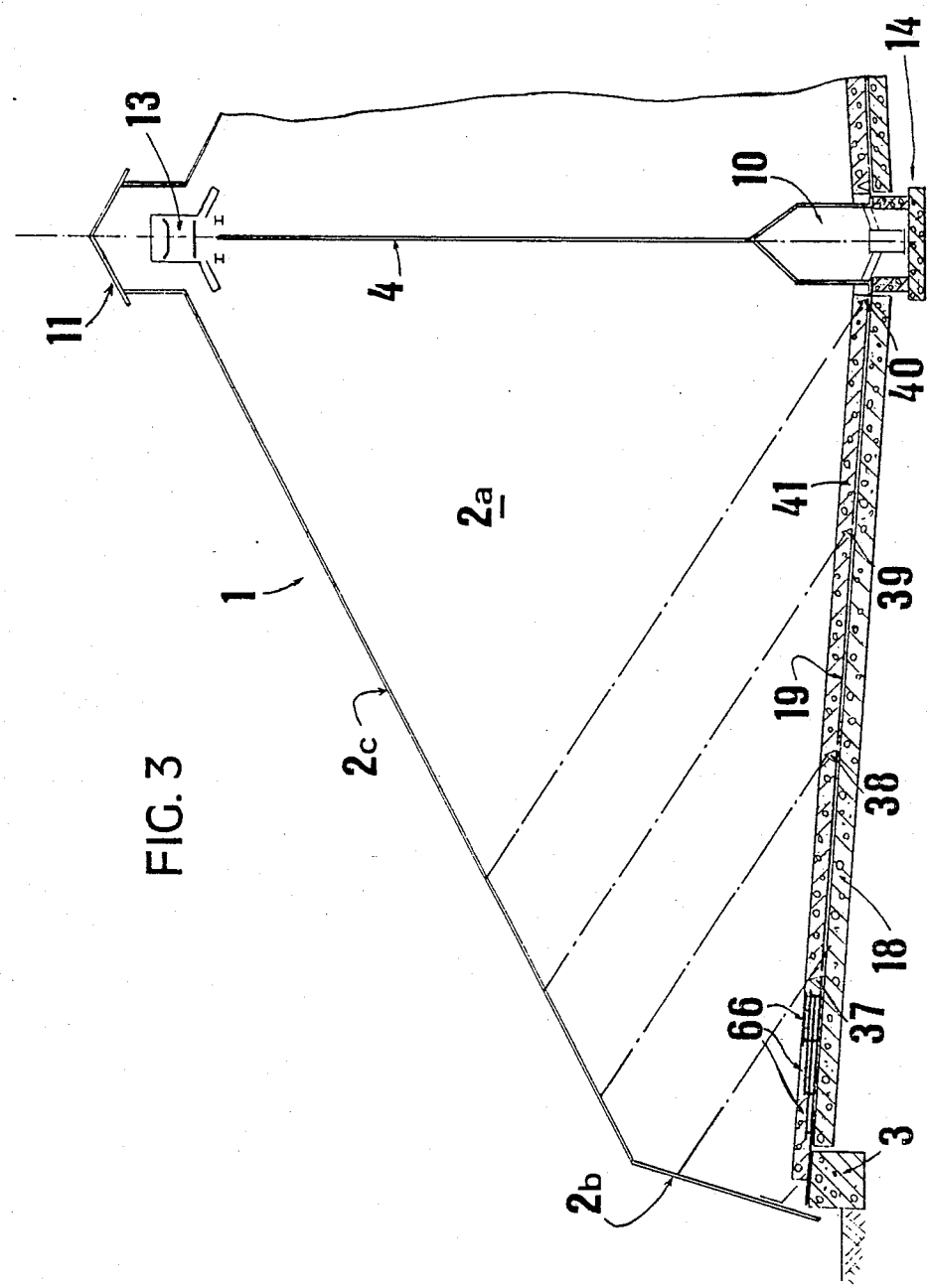
FIG. 3 is a partial cross-section of the silo taken along line II—II of FIG. 2.
Figure 4:
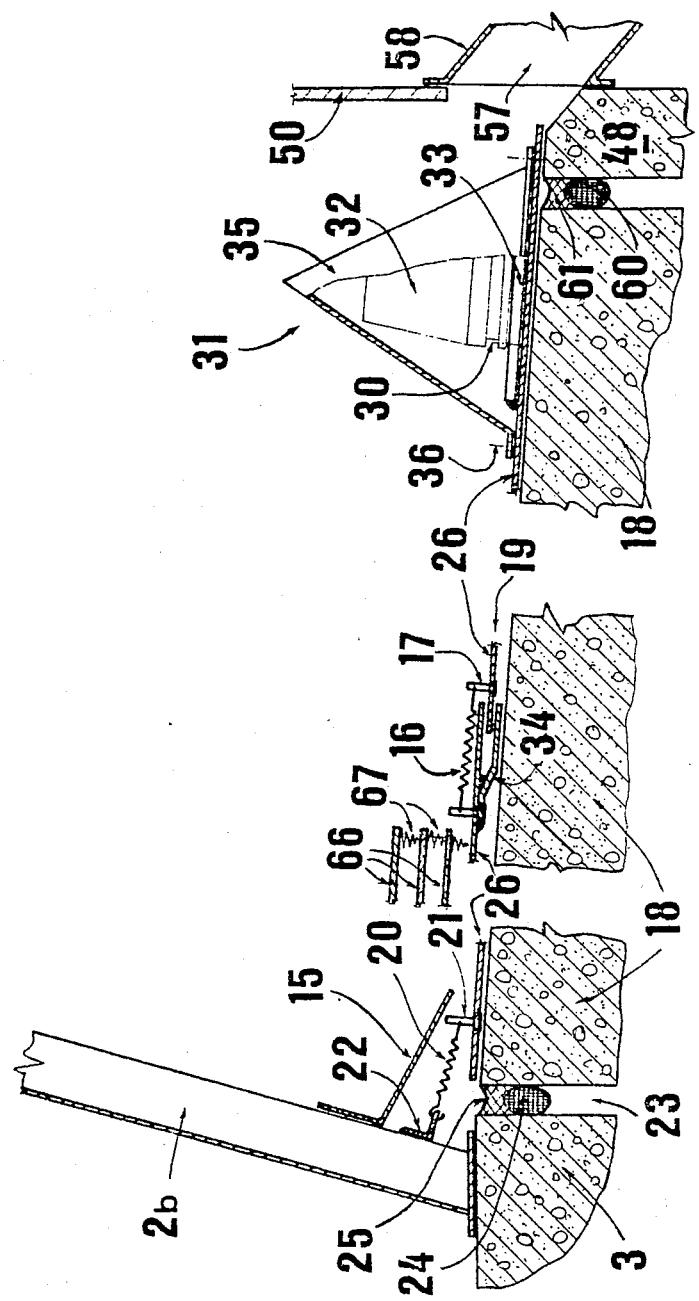
FIG. 4 illustrates the details of FIG. 3 on a larger scale.
Figure 5:
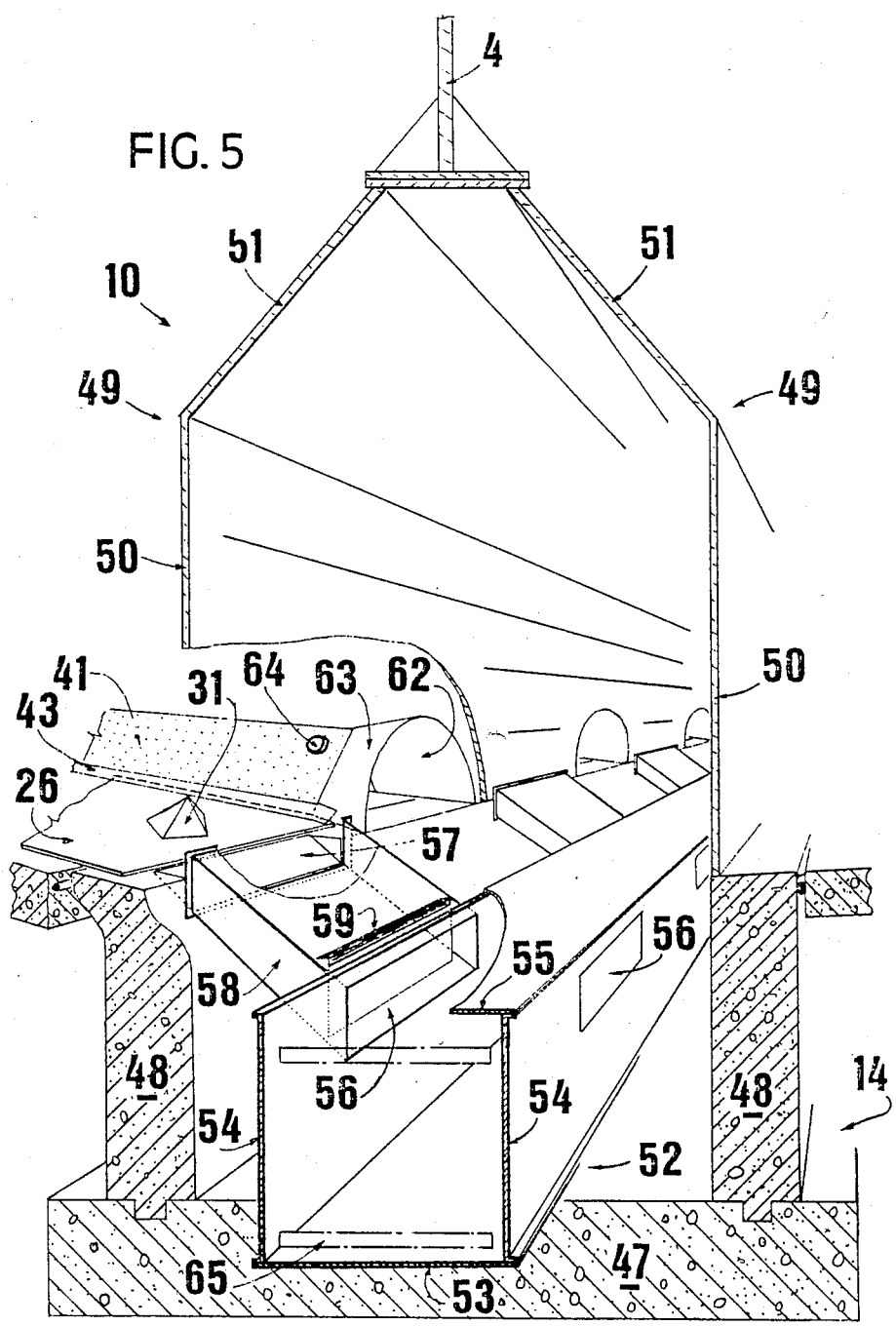
FIG. 5 is a partial cross-sectional, partial perspective view of the central gallery of the silo of the present invention.
Figure 7:
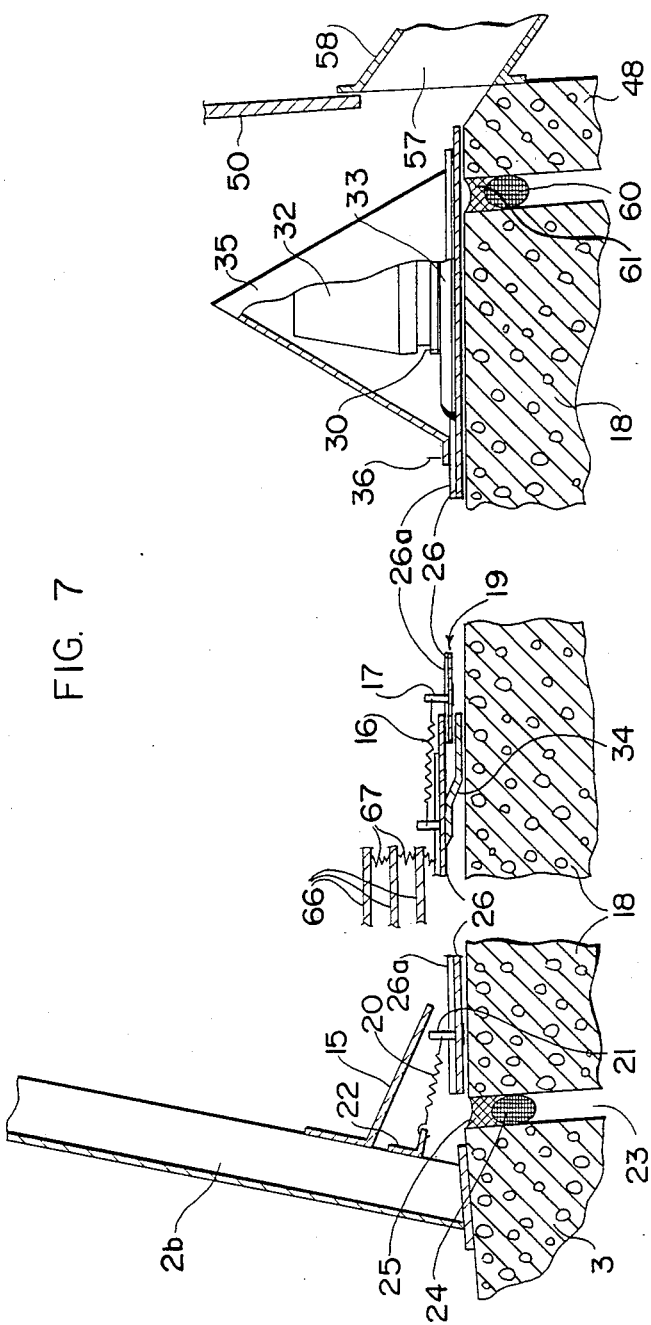
FIG. 7 illustrates an embodiment similar to FIG. 4, which show a plastic surface 26a on plate 26.

FIGS. 3–5 illustrate the floor of the building 1 made, for example, from a concrete slab 18 which extends between foundation beams 3 of walls 2b and a concrete foundation channel 14 formed in gallery 10.

In accordance with the present invention, a steel deck 19 rests on slab 18, and is maintained in its position by springs 20 which are hooked to studs 21 welded along the upper portion of deck 19, as well as an iron angle 22 connected to the structure of walls 2b. A deflector plate 15 is attached to wall 2b and prevents grain from slipping beneath steel deck 19. A premolded joint 24 is positioned around the silo and a topping of a mastic type sealant 25 is fitted into the space 23 left between slab 18 and beam 3.

Figure 6:
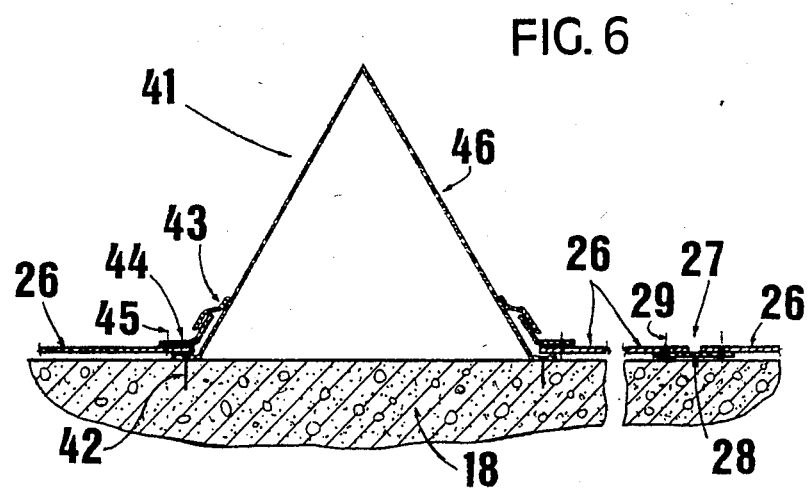
FIG. 6 illustrates a detail of the metal sheet and is taken along line I—I of FIG. 2.

In the embodiment of the invention which is illustrated in FIGS. 2 and 6, steel deck 19 and each of parts 8 and 9 includes several thin metal plates 26 which are assembled laterally, in a two-by-two fashion, at a limited spacing 27. A connecting plate 28 is positioned beneath these parts and is fitted to adjacent plates 26 by volts 29 or other suitable devices.

In accordance with the present invention, organs 31, capable of vibrating metal deck 19, are mounted on at least some of the plates 26 and are positioned as explained hereinafter. Each organ 31 includes a vibrator 32 of any desired type preferably selected from the group consisting of electro-mechanical, eccentric, electromagnetic, hydraulic, pneumatic, e.g., shock, ball, roller or piston, and sonic vibrators. Each vibrator 32 is bolted by high strength bolts 30 onto a rigid base plate 33. The base plate 33 is in turn rigidly connected by welding or other suitable means to corresponding metal support plate 26. Each vibrator 32 is protected by a metal cover 35 retained in position on support plates 26 by screws 36. Covers 35 are pyramidal so as to provide minimal resistance to the flow of particles thereover.

In the preferred embodiment illustrated in FIG. 3, vibrators 32 are located along equidistant lines which run parallel to the central gallery 10. Line 37, 38, 39 and 40 are respectively located along the upper quarter, upper half, lower quarter and bottom of steel deck 19. It should be well understood, however, that dependent upon the size, shape and content of the building 1, vibrators 32 could be positioned at various positions along the surface of deck 19 in order to ensure maximum efficiency of particle transfer towards gallery 10.

In FIG. 4, the junction of plates 26 along their edges in a direction parallel to the central gallery in the vicinity of vibrator lines 37, 38 and 39, is illustrated. In this regard, a grooved plate 34 is rigidly fitted by welding or other appropriate manner beneath upper plate 26 in order to form a groove. Lower plate 26 slides into the groove, and both plates 26 are connected by spring 16, and are hooked to studs 17 which are welded to the plates. This type of arrangement permits flexibility of the connection such that the vibration energy can be dissipated by deflection of the plates rather than rigidity of the supports.

In a preferred embodiment, ventilation ducts 41 are positioned in a perpendicular fashion with respect to gallery 10, between plates 26, and are anchored to slab 18 by conventional anchors 42. As shown in FIG. 6, rubber material strips 43 are fixed to ducts 41, and overlap side plate 44. These strips are attached to plate 26 by rivets 45 or equivalent structure. Ventilation ducts 41 permit the introduction of air into the bins via holes or slots 46 during the ventilation process which is described in greater detail hereinafter.

FIG. 5 illustrates in more detail the central gallery 10, which includes a concrete channel 14 in the foundation formed by a horizontal slab 47, two foundation side walls 48, and two gallery walls 49. Each gallery wall 49 includes a vertical section 50 anchored to a foundation wall 48, and a sloping roof section 51. Both roof sections 51 are connected along the top to support partition walls 4 and 5. Steel casing 52, including a bottom plate 53, two side plates 54, and cover plate 55, rest on slab 47. Horizontal rectangular openings 56 are cut along side plates 54. Similar openings 57 are cut along the base of the vertical section 50, and spouts 58 span openings 56 and 57. Inside each spout 58, a gate 59 controls the flow of grain or other particulate material from a corresponding bin into casing 52, from which the grain is evacuated by a reclamation or recovery chain conveyor 65 (not illustrated).

As shown in FIG. 4, a premolded joint 60 which is topped by a mastic type of sealant 61, is fitted between wall 48 and slab 18. Semi-circular openings 62 are provided between openings 57 and are cut at the base of walls 50. These semi-circular openings communicate with ventilation ducts 41 via transition elements 63. Each opening 62 is closed by a door (not shown) which permits the passage of air from gallery 10 into an associated ventilation duct 41. In each bin, one ventilation duct 41 supports pressure switches 64, one being provided for each line of vibrators 32. Switches 64 are placed so as to initiate movement of the vibrators along lines 40, 39, 38 and 37, successively, in that order.

The silo which has been previously described operates in the following manner. The bins which are limited inside building 1 by exterior walls 2a-2c and by internal partition walls 4-7, located above parts 8 and 9 of the bottom of the silo, are filled either partly or entirely by means of tripper 13. This is illustrated in FIG. 3. The bins can be emptied simultaneously or separately by opening the appropriate gates 59 mounted on spouts 58. Grain flows by gravity into casing 52 and is then removed by the reclaiming or recovery conveyor 65.

As the flow of material by gravity into casing 52 tapers off, however, the slope inside the bin tends to level off due in part to frictional force created between the grains. Once the residual slope of the grain reaches a given level at the foot of steel, i.e., the state of the material which no longer flows by gravity, deck 19, the pressure gauge of switch 64, which is located nearest to the gallery is set to respond to a predetermined force or pressure to command the vibrators 32 along line 40 into motion. The foot or bottom of the residual slope of the grain is thus disrupted by the vibrating action, and a layer of grain crumbles into casing 52. As the foot or bottom of the residual slope progresses away from the central gallery, the grain pressure decreases on the next pressure switch 64, above the previously mentioned switch, until vibrators 32 of line 39 are also set into motion. The destabilizing action at the bottom or foot of the residual slope continues until the bin is substantially completely emptied, i.e., complete reclamation or recovery of the grain is achieved inside a bin. Related to this, the layers of grain associated with each line of vibrators are represented by the slanted lines shown in FIG. 3.

The combination of amplitude and frequency of vibrators 32 can be selected by a regulating unit (not illustrated) so that the vibrating action may each time be adapted to the flowing capacity of the stored material, which is conditioned by such parameters, e.g., as the specific weight, density, water content, angle of inclination of the residual slope, shape and size of kernels, and dust content. Normally, the frequency will vary between 5 hertz and 60 hertz, although these values should not be taken as restricting the scope of the present invention.

For storage buildings of the type suitable for purposes of the present invention, experience has proven that about 57% of the stored material will flow out under the force of gravity. The residual amount, which represents approximately 43% of the total load, thus needs to be and can be recovered as previously indicated.

As a fan blows air into the central gallery, the stored material around the ventilation duct can be aerated by opening the door of the associated opening 62. Several ventilation ducts can simultaneously communicate with the central gallery whenever the stored products needs aeration or ventilation.

The shape of the vibrator covers is intended to streamline the vibrating unit so that the vibrators will not hinder the grain flow. However, within the scope of the present invention, the vibrators and their associated base plates can also be mounted beneath the steel deck. In such case, suitable pits will be formed in the floor slab, at appropriate locations, to house the vibrators.

Of course, the present invention should in no way be restricted to any of the particular embodiments described herein. To the contrary, the present invention is intended to encompass all possible modes of use of the apparatus. Specifically, it should be clearly understood that the shape of the storage structure can be any possible configuration, e.g., cylindrical, rectangular, hemispherical, pyramidal, or any combination of shapes, either in single units or in groups. Furthermore, the gradient of the silo floor will be selected in order to minimize the loss of storage capacity and still ensure an acceptable output. Normally, the slope will vary between 7 and 10%. Again, these figures are not intended to restrict the scope of the invention.

The metal deck is preferably formed from steel or other metal or alloy having a good resistance to abrasion, corrosion and a relatively low coefficient of friction. The thickness of the plate forming the deck will usually vary between 1mm and 2.5mm, and should be selected as an acceptable compromise between the weight of the deck and the fatigue strength, resistance to stress and corrosion of the metal, as well as resistance to the further propagation of vibrations. The plates which compose the deck can be flat, corrugated or ribbed, and may or may not be stiffened.

An alternative embodiment for steel deck 19 is illustrated in FIGS. 2, 3 and 4 as being located between line 37 and wall 2b. In this structure, the steel deck comprises plate 66 stacked on top of plate 26, and which are separated by conical compression spring 67. When the silo is loaded, the weight of grain compresses the spring flat, and plates 26 and 66 contact each other. When the bin is emptied, the grain pressure on plate 66 decreases, thereby releasing spring 67. In this fashion, deck 19 becomes a multi-level plate, and grain can flow outwardly in several layers thereby increasing the output of the system. Springs can also be installed between slab 18 and steel deck 19. Additionally, plates 26 and 66 can receive or support a plastic revetment or wall which is affixed to the plate because of its excellent resistance to abrasion and its very low coefficient of friction.

As a result, the present invention provides a fully automatic collection and recovery system for use in storage facilities having substantially flat bottoms, which does not raise dust, which does not damage kernels, which is essentially self-cleaning, requires only a small power intake and minimal maintenance, and which is suitable for use with all types of cereals or other granular material, as well as being adaptable to any silo configuration. As a result, more economical horizontal silos, which are less expensive to construct, can then become part of fully automated modern terminals.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A bulk storage facility for storing a pile of particulate material, said facility comprising a foundation including a central, substantially horizontal channel, a recovery conveyer disposed in said channel, a base slanted to a degree to cause residual particulate material to have a residual slope and having a lower edge opening into said channel, a plurality of plates positioned adjacent each other so as to form a substantially continuous deck substantially parallel to and supported by said base, a plurality of vibrators mounted on said deck in a predetermined pattern and including means for vibrating said deck with a predetermined amplitude and frequency so as to disrupt the foot of said residual slope to assist conveyance of said particulate material into said conveyer.

2. A bulk storage facility in accordance with claim 1, wherein said plates are metal plates.

3. A bulk storage facility in accordance with claim 1, wherein said plates are substantially flat.

4. A bulk storage facility in accordance with claim 1, wherein said plates are corrugated.

5. A bulk storage facility in accordance with claim 1, wherein said plates are ribbed.

6. A bulk storage facility in accordance with claim 1, wherein said plates are reinforced by stiffeners.

7. A bulk storage faciltiy in accordance with claim 1, wherein at least some of said plates include means for supporting said vibrators.

8. A bulk storage faciltiy in accordance with claim 1, wherein each of said vibrators is bolted onto a base, said vibrator and said base being mounted above said deck.

9. A bulk storage facility in accordance with claim 1, comprising a support plate, connected to a stiff member, said vibrator and said stiff member being mounted below said support plate.

10. A bulk storage silo in accordance with claim 1, wherein said vibrators are electromechanical.

11. A bulk storage silo in accordance with claim 1, wherein said vibrators are eccentric.

12. A bulk storage silo in accordance with claim 1, wherein said vibrators are electromagnetically operated.

13. A bulk storage silo in accordance with claim 1, wherein said vibrators are hydraulically actuated.

14. A bulk storage facility in accordance with claim 1, further comprising a plurality of ventilation ducts positioned transversely to said channel, said ducts being anchored on said base between a plurality of said plates, and being connected to a ventilation gallery.

15. A bulk storage facility in accordance with claim 1, wherein said plates form the top of said deck and are retained in position by a plurality of tension springs, said springs being attached to an exterior wall of said silo and to studs fastened to said plates.

16. A bulk storage facility in accordance with claim 1, wherein one of said plates is attached along an edge to an edge of an adjacent another one of said plates in a parallel fashion to said channel by tension springs, said tension springs being attached to studs which are connected to one of said plates and to another one of said plates.

17. A bulk storage facility in accordance with claim 1, wherein a plurality of covers are positioned over said plates, said covers being spaced by conical compression spring, said plates and said covers comprising a compressible, multi-level deck.

18. A bulk storage silo in accordance with claim 1, wherein said vibrators are pneumatically actuated.

19. A bulk storage silo in accordance with claim 18, wherein said pneumatically actuated vibrators are actuated by a member selected from the group consisting of a shock, ball, roller or piston.

20. A bulk storage facility in accordance with claim 1, wherein said vibrators are located along the surface of said deck along lines which are parallel to said channel.

21. A bulk storage silo in accordance with claim 20, wherein each of said lines of vibrators is adapted to be set into motion by a pressure switch, said pressure switch being connected to a central control unit.

22. A bulk storage facility in accordance with claim 1, wherein said plates are supported by resilient elements fixably secured to a surface of said slab.

23. The bulk storage facility of claim 22, wherein said resilient elements are conical compression springs.

24. An apparatus for removing particulate material from a pile of material stored so as to have a residual slope comprising:
 (a) a slightly slanted support surface having a lower edge opening into a conveyer:
 (b) a substantially continuous deck comprising a plurality of interconnected plates supported by said support surface;
 (c) a plurality of vibrators mounted to said deck for vibrating said deck with a predetermined amplitude and frequency to disrupt said residual slope of stored material
 (d) a plurality of ventilation ducts positioned transversely to said conveyer, and anchored on said floor slab, each one of said ventilation ducts positioned between one and another of said plates.

25. The apparatus of claim 24, wherein each of said vibrators is connected to a base, said base being connected to a stiff member, said vibrator, said base and said stiff member being mounted below said deck.

26. A bulk storage facility comprising a storage building, a foundation including a central channel, means for housing a conveyer disposed in said channel, a slanted floor slab having a lower edge opening into said channel, a deck comprising a plurality of plates supported by said floor slab and a plurality of vibrators mounted on said deck in a predetermined pattern, including means for vibrating said deck with a predetermined amplitude and frequency, and a plurality of ventilation ducts positioned transversely to said channel and anchored to said floor slab, each one of said ventilation ducts being positioned between one and another of said plates.

27. A bulk storage facility comprising a storage building, a foundation including a central channel, means for housing a conveyer disposed in said channel, a slanted floor slab having a lower edge opening into said channel, a deck comprising a plurality of plates supported by said floor slab and a plurality of vibrators mounted on said deck in a predetermined pattern and including means for vibrating said deck with a predetermined amplitude and frequency, wherein one of said metal plates is attached along an edge to an edge of an adjacent another one of said plates in a parallel fashion to said channel by tension springs, said tension springs being hooked to studs which are welded to an upper one of said plates and to a lower one of said plates, wherein a groove is formed by said upper one of said plates and a grooved plate, said grooved plate being fixably secured beneath a lower edge of said upper one of said plates.

28. A bulk storage facility comprising a storage building, a foundation including a central channel, means for housing a conveyer disposed in said channel, a slanted door slab having a lower edge opening into said channel, a deck comprising a plurality of plates supported by said floor slab and a plurality of vibrators mounted on said deck in a predetermined pattern and including means for vibrating said deck with a predetermined amplitude and frequency, wherein a plurality of covers are positioned over said plates, said covers being spaced by conical compression springs, said plates and said covers comprising a compressible, multi-level deck.

29. An apparatus for removing particulate material from a pile of material stored so as to have a residual slope comprising:
 (a) a slightly slanted support surface having a lower edge opening into a conveyer:
 (b) a substantially continuous deck comprising a plurality of interconnected plates supported by said support surface; and wherein said deck has an upper surface and said plates form said upper surface of said deck and are retained in position by a plurality of tension springs, said springs being hooked at one end to an anchor and at another end to studs welded on said plates: and
 (c) a plurality of vibrators mounted to said deck for vibrating said deck with a predetermined amplitude and frequency to disrupt said residual slope of stored material.

30. An apparatus for removing particulate material from a pile of material stored so as to have a residual slope comprising:
 (a) a slightly slanted support surface having a lower edge opening into a conveyer:
 (b) a substantially continuous deck comprising a plurality of interconnected plates supported by said support surface wherein one of said plates is attached along an edge to an edge of an adjacent another one of said plates in a parallel fashion with respect to said conveyor by tension springs, said tension springs being attached to studs which are fixed to an upper one of said plates and to a lower one of said plates; and
 (c) a plurality of vibrators mounted to said deck for vibrating said deck with a predetermined amplitude and frequency to disrupt said residual slope of stored material.

31. An apparatus for removing particulate material from a pile of material stored so as to have a residual slope comprising:
 (a) a slightly slanted support surface having a lower edge opening into a convyer:
 (b) a substantially continuous deck comprising a plurality of interconnected plates supported by said support surface; and wherein a plurality of covers are positioned over said plates, said covers being spaced by conical compression springs, said plates and said covers comprising a compressible, multi-level deck: and
 (c) a plurality of vibrators mounted to said deck for vibrating said deck with a predetermined amplitude and frequency to disrupt said residual slope of stored material.

* * * * *